(12) United States Patent
Winegar

(10) Patent No.: US 6,879,688 B2
(45) Date of Patent: Apr. 12, 2005

(54) TELEPHONE HEADSET WITH INDICATOR LIGHT

(75) Inventor: Patricia M. Winegar, Fresno, CA (US)

(73) Assignee: Lighten-Up, LLC, Fresno, CA (US)

( * ) Notice: Subject to any disclaimer, the term of this patent is extended or adjusted under 35 U.S.C. 154(b) by 540 days.

(21) Appl. No.: 09/909,911

(22) Filed: Jul. 20, 2001

(65) Prior Publication Data

US 2002/0064276 A1 May 30, 2002

Related U.S. Application Data

(60) Provisional application No. 60/246,693, filed on Nov. 9, 2000.

(51) Int. Cl.[7] .............................................. H04M 1/00
(52) U.S. Cl. ..................................................... 379/430
(58) Field of Search ...................... 379/430; 455/575.2; 381/381, 330

(56) References Cited

U.S. PATENT DOCUMENTS

| 4,558,178 | A |   | 12/1985 | Yasuda |           |
|-----------|---|---|---------|--------|-----------|
| 4,633,498 | A |   | 12/1986 | Warnke et al. | |
| 5,210,791 | A |   | 5/1993  | Krasik |           |
| 5,359,647 | A |   | 10/1994 | Regen et al. | |
| 5,457,751 | A | * | 10/1995 | Such ........................... 381/381 |
| 5,608,794 | A | * | 3/1997  | Larson ........................ 379/430 |

* cited by examiner

*Primary Examiner*—Jack Chiang
(74) *Attorney, Agent, or Firm*—Richard A. Ryan

(57) ABSTRACT

A telephone headset with an in-use or off-hook indicator light that uses a light source on or attached to the headband, ear hook, earpiece or boom components of the headset to indicate when the wearer of the headset is using the telephone. The telephone headset is configured for use with the headband type headset where the light source is at the end of an extension member attached to the headset, incorporated into the extension member or incorporated into the headset. The telephone headset is configured for use with the over-the-ear type of headset where the light source is at the end of the extension or incorporated into the extension attached to the ear hook or earpiece component. The extension member can be formed from a section of fiber optic cable. The light source can also connect to a microphone or microphone clip configured for hands-free telephone use.

18 Claims, 4 Drawing Sheets

TELEPHONE HEADSET WITH INDICATOR LIGHT

CROSS-REFERENCE TO RELATED APPLICATIONS

This application claims the benefit of U.S. Provisional Application No. 60/246,693 filed Nov. 9, 2000.

BACKGROUND OF THE INVENTION

A. Field of the Invention

The field of the present invention relates generally to headset apparatuses for use with telephones. More specifically, this invention relates to such telephone headsets having an indicator means thereon for automatically indicating use of the telephone headset. Even more specifically, this invention relates to such telephone headsets having an indicator light thereon to indicate that the person wearing the headset is on the telephone.

B. Background

Many people utilize the telephone as an integral part of their work or frequently at the home. Often these people are on the phone for long periods of time, perhaps even the majority of the time during the day. For convenience, comfort and/or improved efficiency, it is common for these people to utilize a headset that has a connecting cord connected to the telephone, telephone line or telephone system. The typical telephone headsets come in two basic types. One type is the over-the-head headset that has a headband that places an earpiece near the ear and a microphone near the person's mouth. The other type is the ear wrap or jack type that utilizes an earpiece which wraps around the ear with a microphone extending therefrom to be in front of the user's mouth. As with the headband type, a connecting cord connects to the telephone, telephone line or telephone system. However, unlike the previously described headset, this type does not utilize a headband.

Telephone headsets have proven to be very popular because they reduce the weight and difficulty associated with holding a telephone handset for extended periods of time, whether the telephone is held in the hand or on the person's shoulder. Telephone headsets also allow the user some freedom of movement, compared to the standard telephone handset. Although telephone headsets provide significant advantages with regard to ease of use and comfort, they create a problem in that other people are not able to determine if the user of the headset is on a telephone call or between telephone calls unless the wearer is actually talking. When the headset user is not talking, it is very difficult, if not impossible, to determine if the user is listening to another person on the other end of the telephone line or merely waiting between telephone calls. As a result, it is not at all uncommon for someone to come up to a person wearing a telephone headset and start talking to the headset user, not realizing that he or she is actually engaged in a telephone conversation at that time. This often requires the headset user to interrupt either or both the person talking or the person on the other end of the line. Naturally, this can create problems with trying to delicately interrupt someone. Depending on the context, the interruption can present some problems with regard to confidentiality or other private matters. Even if the person who desires to talk to the headset user does not speak, and therefore does not actually interrupt, there is usually an awkward period of time that passes until the headset user indicates that he or she is either available to talk (because they are not on the telephone) or is not available.

There are some telephone indicator mechanisms currently available. Some of these mechanisms require the user to manually activate a switch or button to indicate that they are on the telephone and to switch it off when they are not. The need to manually turn on or off the indicator mechanism severely limits the usefulness of these devices. As would be expected, headset users forget to turn them on, thereby eliminating the benefit of the device, or forget to turn them off, which results in false indication of telephone use (after time, this will be ignored). There are some headset in-use devices that are intended to be automatically activated by use of the headset. Unfortunately, these headset indicator devices also have limitations which have limited the commercial success of the devices.

For instance, U.S. Pat. No. 5,210,791 to Krasik discloses a telephone headset on-line indicator that determines the "on-line" or "off hook" condition by monitoring the voltage potential across the two transmitting lines between the headset and the telephone base unit. A light emitting diode at the end of the microphone boom or mechanisms for lighting up the boom are provided. When the phone is "off the hook" or other in-use condition is determined, the circuitry lights up the diode or the microphone boom to indicate that the user is "on-line" and should not be disturbed. U.S. Pat. No. 5,359,647 to Regen, et al. discloses a headset in-use indicator that utilizes a transformer and amplifier circuit to amplify the audio signals across the transmission lines so as to determine if the telephone headset is in use or off-hook. A signal activates a light emitting diode or light emitting source at the end of the microphone boom. Placement of the light emitting diode on the end of the boom or lighting up the boom limits the ability of other persons to see the light and, therefore, to know when the user should not be disturbed.

What is needed, is an easy to use and effective means of indicating to other people when the telephone headset user is on the telephone, as opposed to just wearing the headset. The preferred headset use indicator would automatically indicate to another person when the telephone line is active so that he or she would know not to interrupt the headset user. To be effective, the indicator should clearly indicate to another that the user is on the telephone line. It is therefore an object of the present invention to overcome the disadvantages associated with presently available headset use indicators and to provide a telephone headset indicator that indicates when the user is actually on a telephone call so that he or she will not be interrupted by others. It is also an objective of the present invention to provide a headset indicator mechanism that is automatically activated when the telephone line is active. It is also an object of the present invention to provide a telephone headset indicator that activates a clearly positioned light when the user is on the telephone.

SUMMARY OF THE INVENTION

The telephone headset with indicator light apparatus of the present invention solves the problems identified above. That is to say, the present invention discloses a new and useful telephone headset that is easy to use and effective at indicating when the headset wearer is on the telephone. The headset of the present invention maintains the lightweight and convenient benefits of telephone headsets while eliminating the problems heretofore associated with the use of these headsets.

The improved telephone headset is configured for use with a telephone unit, such as a telephone, telephone system or telephone line, and the headband and over-the-ear types of headsets. In one embodiment of the present invention, the headset has a headband that is used to support the headset on the head of a user, an earpiece connected to both the headband and the telephone unit for the user to hear the person with whom he or she is on the telephone with and a boom that is connected (typically it is pivotally connected) to the earpiece. At the distal end of the boom is a microphone for the user to speak to the other person on the telephone. A light indicator is attached to or incorporated into the headset and is electrically connected to the telephone unit in a manner that permits it to indicate when the telephone unit is in an off-hook condition. When the telephone is in an off-hook condition, the light source component of the indicator is illuminated to indicate that the user is on the phone and should not be disturbed. The indicator can be a light bulb, one or more light emitting diodes ("LED") or fiber optic cable at the end of an elongated extension member, which can be made to be adjustable in height, connected to the headset's headband, boom or earpiece. Alternatively, the light source can be incorporated inside the extension member or in the headband or the extension member can be made from a section of fiber optic cable.

In another embodiment of the present invention, the telephone headset is of the over-the-ear type of headset that utilizes an ear hook that supports the headset on the head of a user, an earpiece connected to the ear hook and the telephone unit and a boom connected to the earpiece. The boom has the microphone thereon, typically at the distal end of the boom. As with the headband type of headset, the light indicator is located on the headset and electrically connected to the telephone unit for indicating when the telephone unit is in an off-hook condition. The light indicator can be an elongated extension member that is connected to the ear hook or earpiece. The extension member can have a light source on its distal (upward). In another embodiment, the light indicator is a light source, such as a fiber optic cable, incorporated or made into the elongated extension member.

In yet another configuration, the present invention is an improved telephone in-use indicator for use with a hands-free telephone unit having a microphone attached to a microphone clip and a light source electrically connected to the telephone unit for indicating when the telephone unit is in an off-hook condition. The light source can be incorporated into the microphone or microphone clip or it can be at the end of or inside an extension member extending upwardly from the microphone or microphone clip. The light source can also be incorporated into the earpiece component or, if used, the speaker component of the hands-free type of device.

Accordingly, the primary objective of the present invention is to provide a telephone headset with indicator light having the features generally described above and more specifically described below in the detailed description of the preferred embodiments. It is also an important objective of the present invention to provide a telephone headset that is relatively inexpensive to manufacture, easy to use and adaptable to existing telephones. It is also an important objective of the present invention to provide a telephone headset that utilizes a light source on an extension member connected to the headset, in the extension member or in the headset headband itself. It is also an important objective of the present invention to provide a telephone headset indicator that is adaptable to over-the-ear type of headset. The above and other objectives of the present invention will be explained in greater detail by reference to the attached figures and the description of the preferred embodiment which follows.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Figure 2:
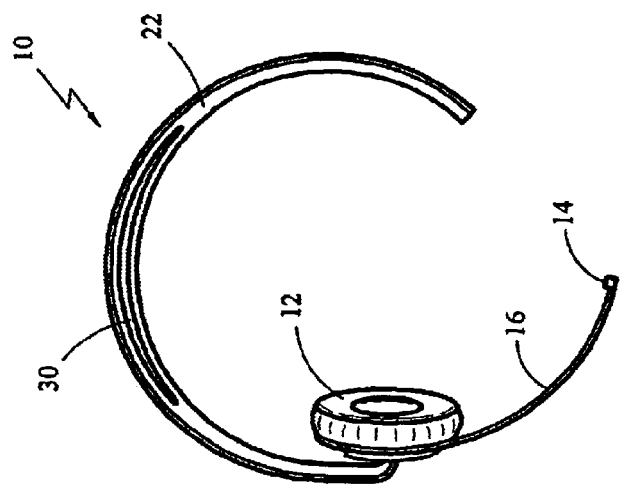
FIG. 2 is an illustration of a headband type of headset incorporating a fiber optic line into the headband in another embodiment of the present invention.

With reference to the figures where like elements have been given like numerical designations to facilitate the reader's understanding of the present invention, and particularly with reference to the embodiments of the present invention illustrated in the attached figures, the preferred embodiments of the present invention are set forth below. In the preferred embodiments of the present invention, shown generally as 10 in FIGS. 1 through 6 for an over-the-head headband type of headset and an over-the-ear or ear wrap type headset, the improved telephone headset with indicator means 10 comprises an earpiece 12 for allowing the user to hear the person on the other end of the telephone line, a microphone 14 at the end of a curved microphone boom 16 for speaking to that person and a connecting line 18 that connects the headset 10 to the telephone, 1 telephone line or telephone system (shown generally as telephone unit 20 in FIG. 1). The over-the-head type headset, shown in FIGS. 1 and 2, also comprises a headband 22 that is configured to go over the user's head and be adjustably and removably affixed thereto. In one embodiment of the present invention, the indicator mechanism, shown generally as 24, comprises an extension member 26 that extends upwardly from headset 10 with a light source 28 at the upwardly most end of extension member 26. Extension member 26 can attach and extend upwardly from the earpiece 12, boom 16 or headband 22 portion of the headset 10 of the present invention.

Figure 1:
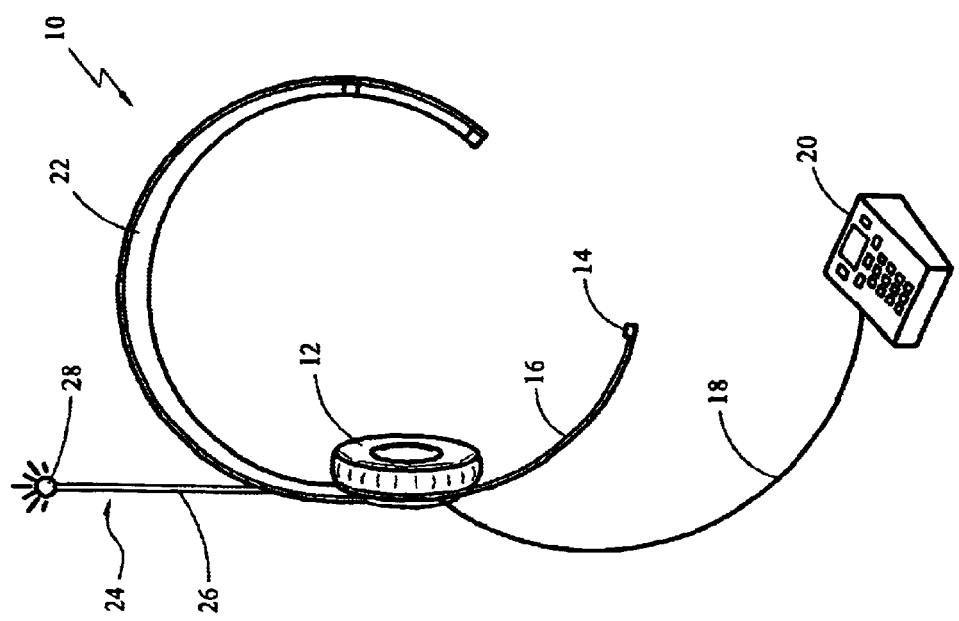
FIG. 1 is an illustration of a headband type of headset incorporating an upwardly extending extension member in one embodiment of the present invention.
Figure 4:
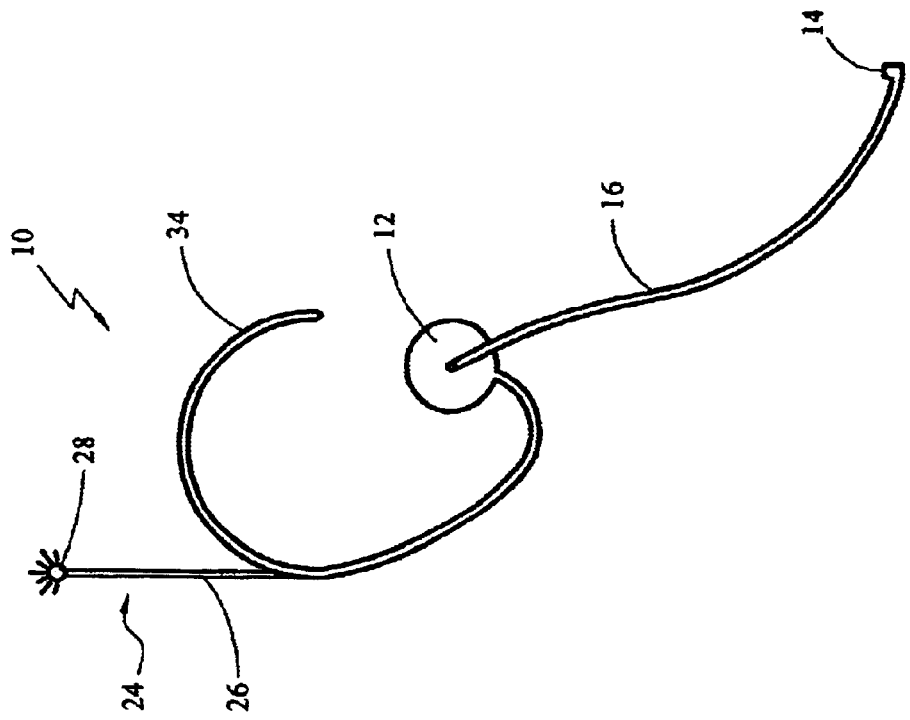
FIG. 4 is an illustration of an over-the-ear type of headset incorporating an upwardly extending extension member with a light source at the end in one embodiment of the present invention.
Figure 3:
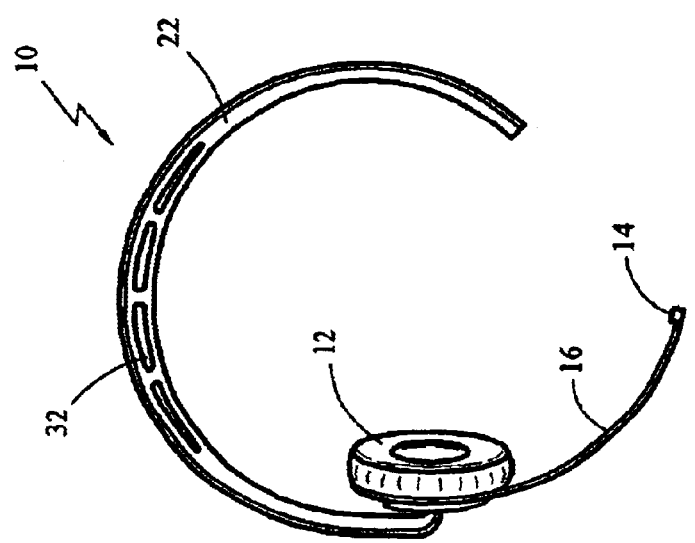
FIG. 3 is an illustration of a headband type of headset incorporating one or more LED strips into the headband in another embodiment of the present invention.
Figure 5:
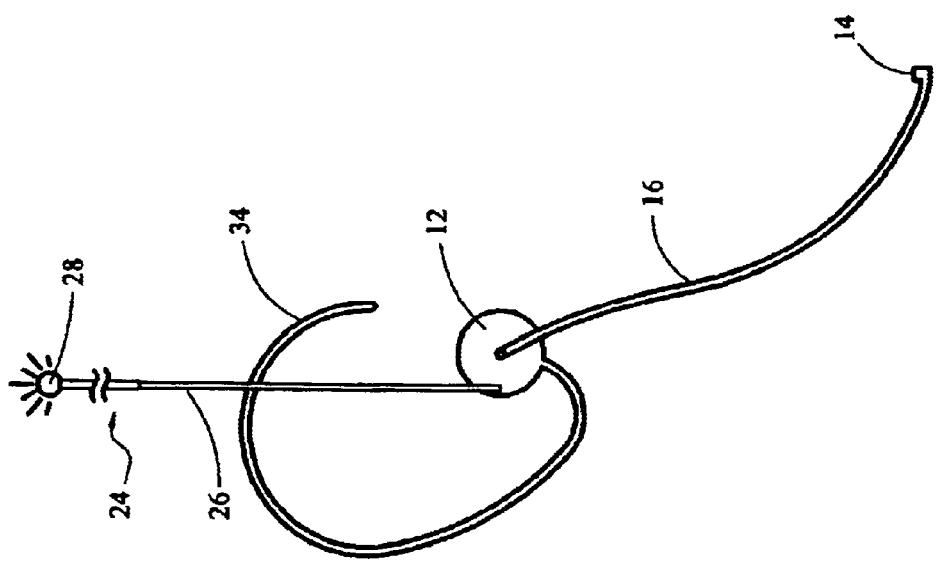
FIG. 5 is an illustration of an over-the-ear type of headset incorporating an upwardly extending extension member attached to the earpiece portion of the present invention.

Extension member 26, shown in FIGS. 1, 4 and 5, can be an antenna-like member that is either made out of a single length piece of material or it can be comprised of two or more telescoping pieces to allow the user to select the height above headband 22 that light source 28 will be positioned. The user can adjust the height of extension member 26 so that it can be seen from any position (i.e., whether the user is facing or has his or her back to someone who may interrupt the user) and whether the user's hair would otherwise interfere with seeing light source 28. Extension member 26 can be made out of a tubular, light weight material so as not to add much weight to headband 22. Materials suitable for extension member 26 include lightweight metals, plastic, fiberglass and the like. The wiring necessary to connect the telephone transmission wires to the light source can pass through the interior of extension member 26 to connect to light source 28. As is known in the art (i.e., as disclosed in the Krasik patent referenced above), light source 28 is wired or otherwise connected to the telephone connecting line 18 such that when the telephone 20 on-hook or on-line signal is active (i.e., when the headset user is on the telephone 20) the light source 28 is turned on to indicate that the user is "talking" on the telephone 20 (whether they or the person on the other end of the line are actually speaking or not). The light source 28 can be a standard small light bulb or a light emitting diode ("LED") that is connected to the electrical wiring of the telephone headset 10 or it can be a fiber optic light source, such as a fiber optic line that terminates at the end of extension 26 or which emits light along extension 26 (requiring extension 26 to be made out of a transparent or semi-transparent material). Alternatively, extension 26 can be formed from a sufficiently stiff section of fiber optic cable, such that the fiber optic cable is the extension. As set forth above, light can emit from the end or the sides of extension 26. The light source 28 can emit light of any one of a variety of colors, however, it is likely that certain colors will be more visible and, therefore, more desirable for certain uses.

Figure 6:
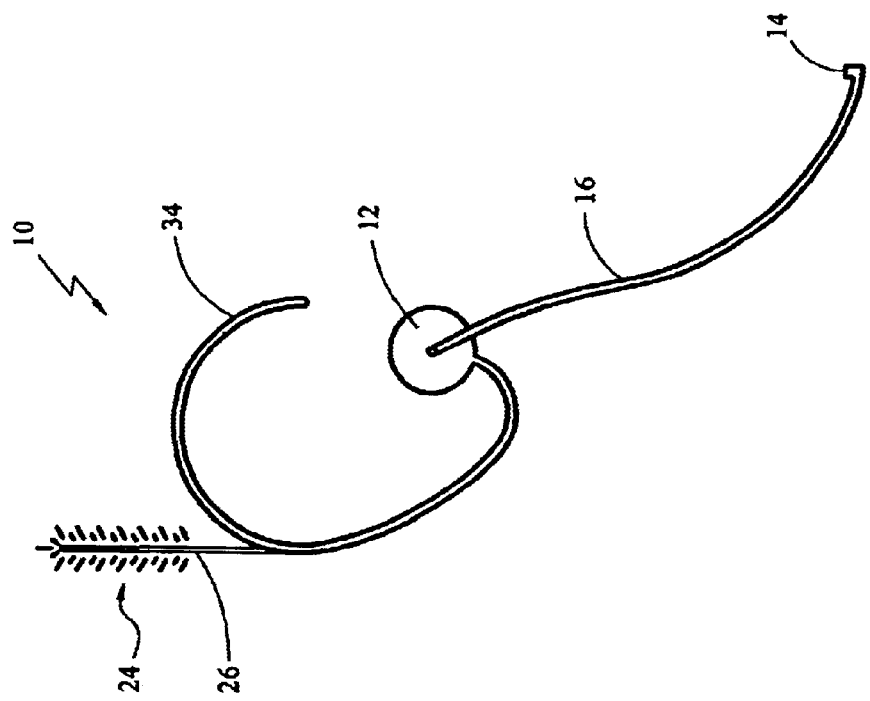
FIG. 6 is an illustration of an over-the-ear type of headset incorporating an upwardly extending extension member with a fiber optic line therein in one embodiment of the present invention.

One embodiment of the present invention, shown in FIGS. 2 and 6, incorporates fiber optic line(s) directly into the improved headset 10. Typically, fiber optic light sources comprise an outer plastic tubing with one or more strands of fibers inside the tubing that transmit light from one end of the tubing to the other end. Some types of fiber optic light lines utilize an opaque tubing that primarily transmits the light to the end of the tubing where it can radiate light similar to a light bulb. Another type of fiber optic cable is known as side-emitting fiber optic cables due to the transparent nature of the tubing, which causes light to emit from the entire length of the tubing, or at least that portion that is not intentionally blackened out. In either type of fiber optic line, the tubing is typically made out of plastic or other materials and are known to be flexible and lightweight. Unlike the electrical wires used for standard lighting, fiber optic lines do not transmit electricity along the length of the line and do not heat up from the transmission of the light. To get the light into the optic fibers, an end of the line should be open (i.e., not sealed or closed) such that the hollow optic fibers can be exposed to an emitting light source. The side-emitting fiber optic line 30 can be used along the entire, or a desired portion, of headband 22, as shown in FIG. 2, to indicate use of the telephone 20. When the user is on the phone (i.e., the telephone is off the hook), light will be transmitted through the fiber optic line 30 lighting up the area of the headband 22. Alternatively, one or more LED strips, shown as 32 in FIG. 3, can be utilized to light up the headband to indicate use of the telephone 20 by the user (i.e., telephone off the hook).

As shown in FIGS. 4, 5 and 6, which illustrate the use of the present invention with an over-the-ear or ear wrap type of headset 10, the indicator light source 28 can be located at the end of or along extension member 26 that extends upwardly from headset 10, which is typically an adjustable frame-type unit having ear hook 34 that connects around the base of a user's ear. This type of headset is preferred by many people do to the less intrusive nature of the headset 10 and the reduced likelihood of affecting the user's hair. FIG. 4 illustrates the embodiment where a light bulb or LED 28 is positioned at the furthermost upward end of extension member 26 and extension member 26 connects directly to ear hook 34 and extends upwardly therefrom. FIG. 5 illustrates the embodiment where extension member 26 connects directly to earpiece 12 and extends upwardly therefrom. FIG. 6 illustrates the use of a side emitting fiber optic cable (not shown) inside extension member 26, causing part or all of extension member 26 to light up when the user is on the telephone 20. As set forth in the headband embodiment above, extension member 26 can formed from a sufficiently stiff section of fiber optic cable that emits light from the sides and/or end of extension 26. In each of these embodiments, extension member 26 is preferred to be adjustable in height (i.e., by being telescoping or otherwise) to allow the user to adjust the position of light source 28 so that it can be best seen by someone who approaches and who would otherwise disturb the user of headset 10. For instance, for some users it is necessary to adust the height of light source 28 upward to avoid interference with their hair.

In either headset 10 configuration, i.e., the headband type or ear wrap type, the indicator 24 should be lightweight so as not to be bothersome and bright enough so as to effectively indicate use of telephone 20. The light source indicator 24 is wired or otherwise connected to the telephone line 18 such that when telephone 20 is active (i.e., the headset user is on the telephone with another person), the indicator 24 will automatically be activated. As soon as the headset user disconnects from the telephone line 18 (i.e., hangs up), the indicator 24 will deactivate, thereby indicating that the headset user is available for other (i.e., non-telephone) conversations.

In use, the headset user merely places the headset 10 on as he or she would normally utilize the headset 10, whether it is the over-the-head type or ear wrap type. If an adjustable extension 26 is utilized, the user can extend it to the desired height. No other effort is required by the headset user. When the telephone rings or the user makes a telephone call, the indicator 24 will become activated and light source 28 will emit light to indicate the telephone headset 10 is in use (that the telephone 20 is "off-hook" or the user is "on-line"). Light source 28, 30 or 32 can be any desired color. Use of the headset 10 of the present invention allows a user's co-workers or other persons to easily determine that he or she is "talking" on the telephone 20 and should not be disturbed.

In addition to the above, the headset of the present invention is adaptable for use with the radio/intercom connecting headsets that are utilized by many people in various industries. For instance, many fast food and other companies utilize a radio headset that allows the user to be in communication with each other or customers. In this manner, when a customer of such an establishment or a co-worker is near (or at least in sight) of the user of the headset 10, they will know when the user is conversing with another person and know not to speak to the user. This will avoid such problems as where a person orders food, pulls up to the window and then starts talking to the order person while the order person, unbeknownst to the person starting to talk, is conversing with another person ordering food. Many other example are also applicable to headset 10.

Figure 8:
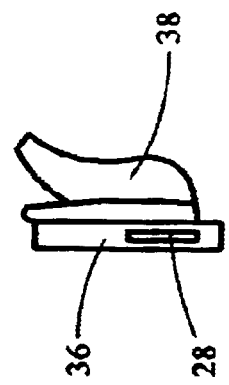
FIG. 8 is an illustration of use of the present invention incorporated into the microphone of a hands-free telephone device.
Figure 7:
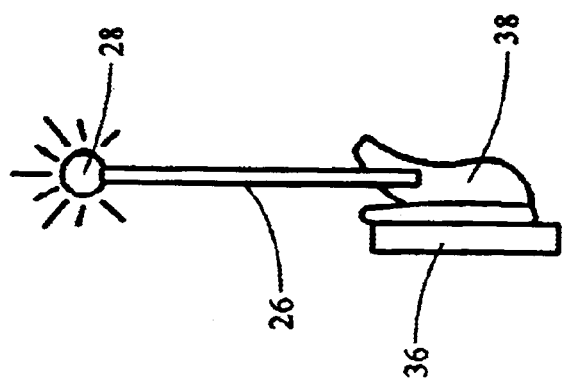
FIG. 7 is an illustration of use of the present invention incorporated into an extension member attached to a microphone of a hands-free telephone device.

The headset 10 of the present invention can also be utilized with hands-free cellular/mobile telephones that some people use while driving their vehicles or during other activities where there hands need to be free. In one configuration of this type of use, shown as FIG. 7, extension member 26 and light source 28 can be attached to and extend upwardly from the microphone 36 or microphone clip 38 that attaches to an article of the person's. Alternatively, not shown, extension member 26 and light source 28 can attach to the earpiece portion of these devices. In another alternative embodiment of the present invention, shown in FIG. 8, light source 28 can be incorporated directly onto the microphone 36 or the microphone clip 38. In these configurations, a person near the user of the present invention (such as a person traveling in the same vehicle with the user) will know that the user is on the line with someone whether the user is actually speaking or not (i.e., the user is just listening). As with the other embodiments, the present invention can help prevent the user from being interrupted while they are on the telephone, particularly when the user is not speaking and, therefore, would not otherwise indicate to others that they are connected on the telephone.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use. The present invention resides in the novel features of form, construction, mode of operation and combination of elements presently described and understood by the claims.

What is claimed is:

1. An improved telephone headset for use with a telephone unit, comprising:
   an ear hook for supporting said headset on the head of a user;
   an earpiece attached to said ear hook and operatively connected to said telephone unit, said earpiece configured to transmit sound from said telephone unit into an ear of said user;
   a boom connected to said earpiece, said boom having a microphone thereon; and
   an extension member connected to said ear hook, said extension member configured to extend generally upwardly from said headset, said extension member having a light source electrically connected to said telephone unit for indicating when said telephone unit is in an off-hook condition.

2. The telephone headset of claim 1, wherein said extension member is generally elongated.

3. The telephone headset of claim 1, wherein said light source is located at the upward end of said extension member.

4. The telephone headset of claim 1, wherein said light source is disposed inside said extension member.

5. The telephone headset of claim 1, wherein said extension member is adjustable in height.

6. The telephone headset of claim 1, wherein said ear hook is configured to be supported by said ear of said user.

7. The telephone headset of claim 1, wherein said ear hook is configured to at least partially encircle said ear of said user.

8. The telephone headset of claim 7, wherein said ear hook is configured to substantially encircle said ear of said user.

9. The telephone headset of claim 1, wherein a portion of said extension member extends above the head of said user.

10. The telephone headset of claim 1, wherein at least a portion of said light source is above the head of said user.

11. The telephone headset of claim 1, wherein at least a portion of said extension member includes a fiber optic cable configured to transmit light through said fiber optic cable.

12. The telephone headset of claim 11, wherein at least a portion of said fiber optic cable is configured to transmit light through a side of said fiber optic cable.

13. An improved telephone headset for use with a telephone unit, comprising:
    an ear hook for supporting said headset on the head of a user, said ear hook configured to be supported by an ear of said user and at least partially encircle said ear;
    an earpiece attached to said ear hook and operatively connected to said telephone unit, said earpiece configured to transmit sound from said telephone unit into said ear of said user;
    a boom connected to said earpiece, said boom having a microphone thereon; and
    an extension member connected to said ear hook, said extension member configured to extend generally upwardly from said headset, said extension member having a light source electrically connected to said telephone unit for indicating when said telephone unit is in an off-hook condition.

14. The telephone headset of claim 13, wherein said ear hook is configured to substantially encircle said ear of said user.

15. The telephone headset of claim 13, wherein said extension member is generally elongated and a portion of said extension member extends above the head of said user.

16. The telephone headset of claim 15, wherein at least a portion of said light source is above the head of said user.

17. The telephone headset of claim 13, wherein at least a portion of said extension member includes a fiber optic cable configured to transmit light through said fiber optic cable.

18. The telephone headset of claim 17, wherein at least a portion of said fiber optic cable is configured to transmit light through a side of said fiber optic cable.

* * * * *